(12) United States Patent
Nogami et al.

(10) Patent No.: US 8,414,014 B2
(45) Date of Patent: Apr. 9, 2013

(54) CURTAIN AIRBAG DEVICE FOR VEHICLE

(75) Inventors: Mitsuo Nogami, Yokohama (JP); Ryuta Kon, Yokohama (JP); Takashi Kasahara, Yokohama (JP); Yutaka Nakajima, Yokohama (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 12/997,994

(22) PCT Filed: Jun. 9, 2009

(86) PCT No.: PCT/JP2009/060483
§ 371 (c)(1),
(2), (4) Date: Dec. 14, 2010

(87) PCT Pub. No.: WO2009/157300
PCT Pub. Date: Dec. 30, 2009

(65) Prior Publication Data
US 2011/0101659 A1 May 5, 2011

(30) Foreign Application Priority Data
Jun. 27, 2008 (JP) .................. 2008-168894

(51) Int. Cl.
*B60R 21/16* (2006.01)
(52) U.S. Cl. .................. 280/728.2; 280/730.2
(58) Field of Classification Search ............... 280/730.2, 280/728.2
See application file for complete search history.

(56) References Cited

U.S. PATENT DOCUMENTS

| | | | |
|---|---|---|---|
| 7,357,408 | B2 | 4/2008 | Hall et al. |
| 2004/0007857 | A1 | 1/2004 | Sonnenberg et al. |
| 2006/0157958 | A1 | 7/2006 | Heudorfer et al. |

FOREIGN PATENT DOCUMENTS

| | | | |
|---|---|---|---|
| JP | 2000-079864 | | 3/2000 |
| JP | 2001-206185 | | 7/2001 |
| JP | 2004-142530 | * | 5/2004 |
| JP | 2006-088764 | | 4/2006 |
| JP | 2006-193151 | | 7/2006 |
| JP | 2008-260425 | | 10/2008 |

OTHER PUBLICATIONS

International Search Report for International Application No. PCT/JP2009/060483, dated Sep. 15, 2009, 4 pages.

\* cited by examiner

*Primary Examiner* — Eric Culbreth
(74) *Attorney, Agent, or Firm* — Brinks Hofer Gilson & Lione

(57) ABSTRACT

A curtain airbag device for a vehicle having a lightweight, simplified, and inexpensive structure can prevent a curtain airbag from being caught by a pillar garnish when the airbag is deployed and inflated, and can restrict the deployment direction of the airbag. The curtain airbag may have sub-chambers formed therein that are folded together with the curtain airbag, and disposed adjacently thereto. The sub-chambers have a communication path formed therein that communicates with the curtain airbag. The curtain airbag is provided with tab cloth strips for supporting and fixing the curtain airbag. The tab cloth strips have an attachment section formed thereon and an annular binding section that binds together the curtain airbag and the sub-chambers. The binding section is provided with a tearing section to be torn when the curtain airbag is deployed and inflated and an anchoring section anchoring the airbag to the vehicle body side.

20 Claims, 12 Drawing Sheets

CURTAIN AIRBAG DEVICE FOR VEHICLE

This application is a National Stage of International Application No. PCT/JP2009/060483 filed on Jun. 9, 2009, which claims priority to Japanese Patent Application No. JP 2008-168894 filed with the Japanese Patent Office on Jun. 27, 2008, the entirety of which are hereby incorporated by reference.

TECHNICAL FIELD

The present invention relates to a curtain airbag device for a vehicle that can restrict the deployment direction of a curtain airbag.

BACKGROUND ART

An arrangement structure of a head protecting airbag device including an airbag that is deployed in a curtain-like shape along a roof side rail is disclosed for example in Patent Document 1.

Patent Document 1 describes a structure including an airbag deployment direction restriction means composed of a metal plate with a cross section having at least an L-like curved portion that is set in a roof side rail site that is close to an upper end section of a B pillar garnish and has a wall section that extends from a roof side rail site toward an upper end portion of a B pillar garnish and a deployment member (guide plate) that is fixed at a base end section thereof to the metal plate, positioned on the vehicle interior side of a folded airbag and has a deployment section that deploys in a position that covers the upper end section of the B pillar garnish when the airbag is deployed.

Patent Document 1: Japanese Patent Application Laid-open No. 2000-33845

The above-described art resolves a problem of the curtain airbag being caught by the metal plate and the guide plate fixed by the base end section thereof to the metal plate between the vehicle body and the pillar garnish. As a result, the curtain airbag is smoothly deployed toward the interior side of the vehicle cabin.

However, the metal plate is heavy and inconvenient to handle. The guide plate should be fixed to the metal plate and the fixing operation is complex. Further, cost is increased because the metal plate and guide plate are used.

DISCLOSURE OF THE INVENTION

The present invention has been created with consideration for the above-described problems inherent to the related art and it is an object of the present invention to provide a curtain airbag for a vehicle that has a lightweight, simplified, and inexpensive structure, can prevent a curtain airbag from being caught by a pillar garnish during deployment and inflation, and can restrict the deployment direction of the curtain airbag.

The present invention provides a curtain airbag device for a vehicle in which a curtain airbag, accommodated between a head lining side edge and a vehicle body along the head lining side edge, is inflated by high-pressure gas introduced from an inflator, applies pressure to the head lining side edge to cause the head lining side edge to separate from a pillar garnish upper end section, and is deployed from a downward opening that is formed between the head lining side edge and the pillar garnish upper end section and toward the interior side of a vehicle cabin, wherein the curtain airbag has a sub-chamber formed therein that is folded together with the curtain airbag, and disposed adjacently thereto to be deployed and inflated on the vehicle exterior side of the curtain airbag by high-pressure gas introduced from the inflator; the sub-chamber has a communication path formed therein that connects the sub-chamber to the curtain airbag; the curtain airbag is provided with a tab cloth strip for supporting and fixing the curtain airbag; the tab cloth strip has an attachment section formed thereon that is attached to the vehicle body and an annular binding section that binds together the curtain airbag and the sub-chamber, and the binding section has a tearing section formed therein that is to be torn when the curtain airbag is deployed and inflated and an anchoring section joined to the curtain airbag and anchoring the curtain airbag to the vehicle body side.

Further, the present invention also provides a curtain airbag device for a vehicle in which a curtain airbag is attached to a vehicle body and accommodated between a head lining side edge and the vehicle body along the head lining side edge, is inflated by high-pressure gas introduced from an inflator, applies pressure to the head lining side edge to cause the head lining side edge to separate from a pillar garnish upper end section, and is deployed from a downward opening that is formed between the head lining side edge and the pillar garnish upper end section, toward the interior side of the vehicle cabin, wherein the curtain airbag has a sub-chamber formed therein that is folded together with the curtain airbag, and disposed adjacently thereto; the sub-chamber has a communication path formed therein that connects the sub-chamber to the curtain airbag; the sub-chamber and the curtain airbag are inflated in a state of being parallel to each other in a transverse direction of the vehicle by high-pressure gas introduced from the inflator, and the sub-chamber is deployed and inflated on the vehicle exterior side of the curtain airbag, thereby pushing the curtain airbag toward the interior side of the vehicle cabin.

It is preferred that a length of the sub-chamber in the transverse direction of the vehicle when the sub-chamber is deployed and inflated is set larger than a width of a gap formed between the vehicle body and the pillar garnish.

Further, the present invention also provides a curtain airbag device for a vehicle in which a curtain airbag is attached to a vehicle body and accommodated between a head lining side edge and the vehicle body along the head lining side edge, where the airbag is inflated by high-pressure gas introduced from an inflator, applies pressure to the head lining side edge to cause the head lining side edge to separate from a pillar garnish upper end section, and is deployed from a downward opening that is formed between the head lining side edge and the pillar garnish upper end section and toward the interior side of the vehicle cabin, wherein the curtain airbag has a sub-chamber formed therein that is folded together with the curtain airbag and disposed adjacently thereto; the curtain airbag is further provided with a gas duct which is connected to the inflator, and to which high-pressure gas is introduced by action of the inflator, and a secondary inflation section which is inflated by the high-pressure gas that has passed through the gas duct; the sub-chamber has a communication path formed therein that connects the sub-chamber to the gas duct, and the sub-chamber and the secondary inflation section are inflated in a state of being parallel to each other in a transverse direction of the vehicle while the sub-chamber is being positioned on the exterior side of the vehicle, and the gas duct is inflated between the sub-chamber and the secondary inflation section, whereby the secondary inflation section is pushed by the sub-chamber and the gas duct toward the interior side of the vehicle cabin.

It is preferred that a length of the sub-chamber and the gas duct in the transverse direction of the vehicle when the subchamber and the gas duct are deployed and inflated be set larger than a width of a gap formed between the vehicle body and the pillar garnish.

It is preferred that the sub-chamber be provided in a position so as to be deployed and inflated further upward than the pillar garnish upper end section.

It is preferred that the sub-chamber be provided with a plurality of communication paths.

It is preferred that a length of the sub-chamber in the longitudinal direction of the vehicle be set larger than a length of the pillar garnish in the longitudinal direction of the vehicle.

It is preferred that the sub-chamber be disposed in a state of protruding from a front end section and a rear end section of the pillar garnish.

It is preferred that the folded curtain airbag be wound so that a draw-out direction thereof faces the vehicle exterior side.

It is preferred that the tearing section be formed of a main slit line formed in the tab cloth strip and a sub-slit line formed on the circumference of the main slit line.

The curtain airbag for a vehicle in accordance with the present invention has a lightweight, simplified, and inexpensive structure, can prevent a curtain airbag from being caught by pillar garnish during deployment and inflation, and can restrict the deployment direction of the curtain airbag.

EXPLANATION OF REFERENCE NUMERALS

Figure 1:
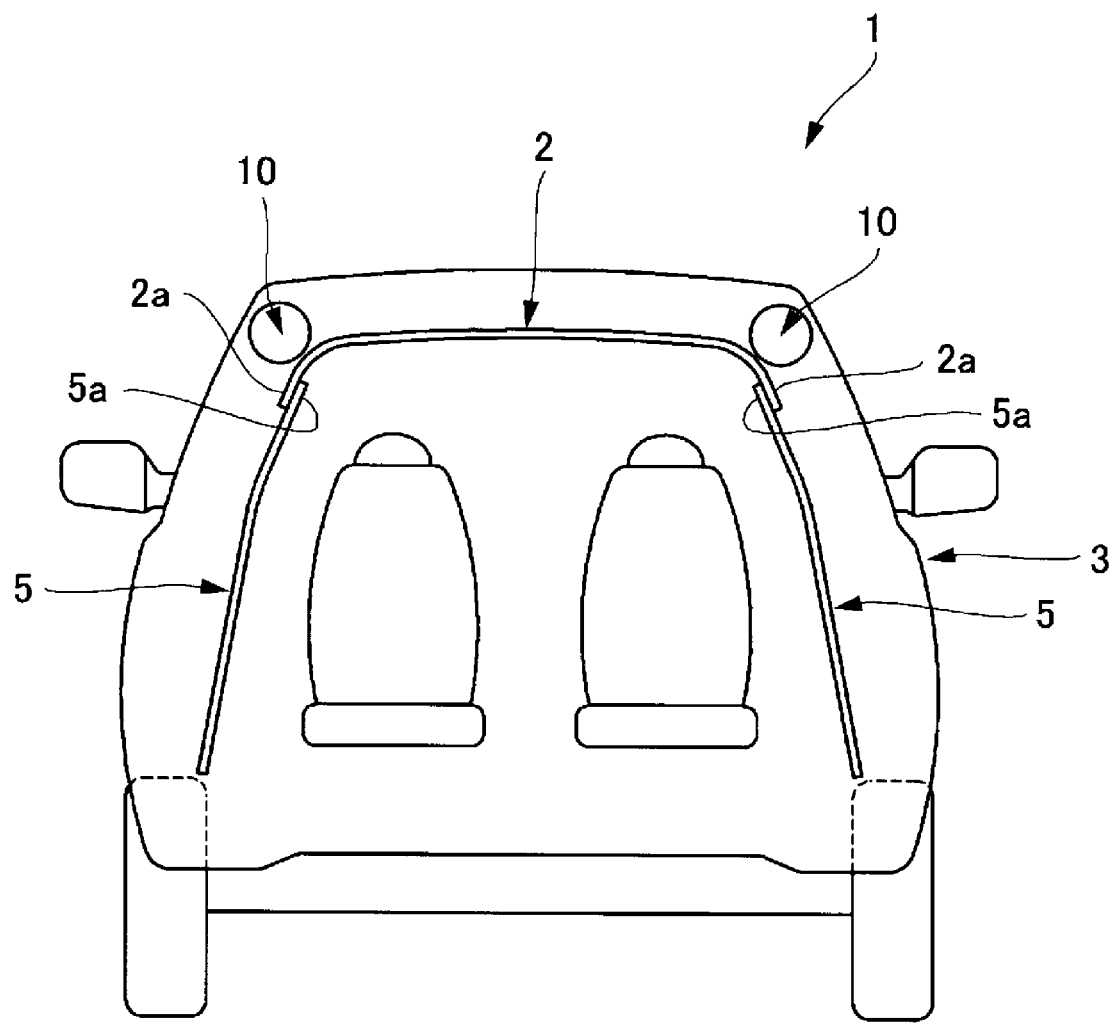
FIG. 1 is a front cross-sectional view illustrating a state in which the curtain airbag device for a vehicle in accordance with the present invention is installed on the vehicle, this view illustrating a preferred embodiment of the device.

1 curtain airbag device for vehicle
2 head lining
2*a* side edge
3 vehicle body
4 inflator
5 pillar garnish
5*a* upper end section
6 opening
10 curtain airbag
13 communication path
14 gas duct
15 secondary inflation section
21 first sub-chamber
22 second sub-chamber
31 binding section
32 tearing section
32*a* main slit line
32*b* sub-slit line
33 anchoring section
34 first tab cloth strip
35 second tab cloth strip
36 attachment section

BEST MODE FOR CARRYING OUT THE INVENTION

The first embodiment of the curtain airbag device for a vehicle in accordance with the present invention will be explained below in greater detail with reference to the appended drawings. As shown in FIG. 1, a curtain airbag device 1 for a vehicle according to the first embodiment includes a curtain airbag 10 accommodated between a head lining 2 and a vehicle body 3 along a side edge 2*a* of the head lining 2 of the vehicle. The curtain airbag 10 is inflated when high-pressure gas is introduced from an inflator 4 connected thereto. The inflated curtain airbag 10 applies pressure to the head lining side edge 2*a*. As a result, the head lining side edge 2*a* is separated from a pillar garnish upper end section 5*a*. Because of the separation, a downward opening 6 is formed between the head lining side edge 2*a* and the pillar garnish upper end section 5*a*. The curtain airbag 10 is deployed and inflated from the opening 6 toward the interior side of the vehicle cabin.

The curtain airbag 10 has two sub-chambers 21, 22 formed therein. The sub-chambers 21, 22 are folded together with the curtain airbag 10 and disposed adjacently to the curtain airbag 10. The sub-chambers 21, 22 are deployed and inflated on the vehicle exterior side of the curtain airbag 10 when high-pressure gas is introduced from the inflator 4. A communication path 13 is formed between the curtain airbag 10 and the sub-chambers 21, 22 so that the curtain airbag communicates with the sub-chambers. The curtain airbag 10 is provided with two tab cloth strips 34, 35 for supporting and fixing the curtain airbag 10 and the sub-chambers 21, 22, respectively. Annular binding sections 31 that bind together the curtain airbag 10 and the sub-chambers 21, 22 are formed at the tab cloth strips 34, 35. A tearing section 32 torn when the curtain airbag 10 is deployed and inflated is formed in the binding section 31. The bonding section 31 is provided with an anchoring section 33 joined to the curtain airbag 10 and anchoring the deployed curtain airbag 10 to the vehicle body 3 side.

The sub-chambers 21, 22 and the curtain airbag 10 are inflated in a state of being parallel to each other in the transverse direction of the vehicle when high-pressure gas is introduced from the inflator 4. In particular, the sub-chambers 21, 22 are deployed and inflated on the vehicle exterior side of the curtain airbag 10, thereby pushing the curtain airbag 10 toward the interior side of the vehicle cabin.

Figure 2:
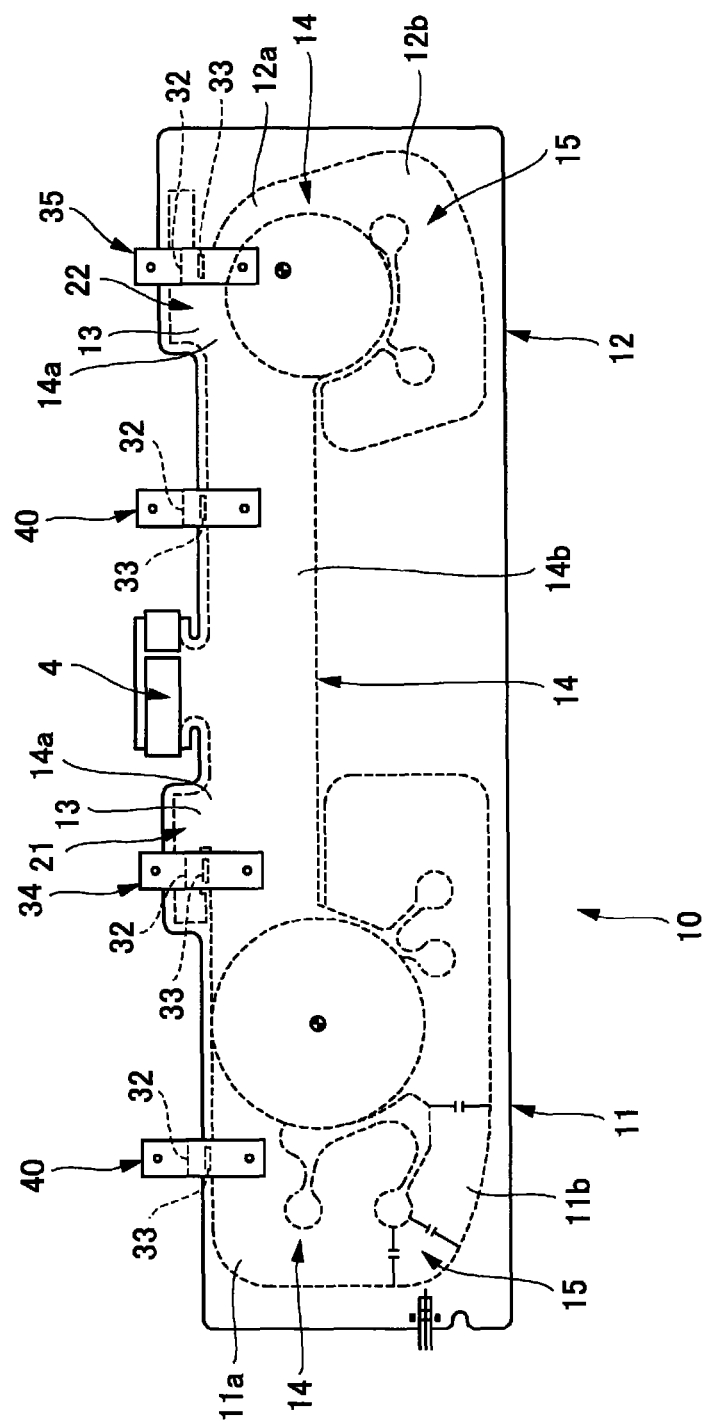
FIG. 2 is a plan view of a deployed state illustrating the first embodiment of the curtain airbag device for a vehicle in accordance with the present invention.

FIG. 2 shows an example of the deployed and inflated curtain airbag 10. The curtain airbag 10 is formed as a bag elongated in the longitudinal direction of the vehicle, for example, by sewing two base cloths together. The curtain airbag 10 has a front chamber 11 deployed and inflated between a side window and an occupant's head and serving to protect the occupant's head (occupant of a driver seat and a passenger seat) forward of the vehicle and a rear chamber 12 deploying and inflating between the side window and the occupant's head to protect the occupant's head rearward of the vehicle.

A gas duct 14 is formed in a substantially upper half of the curtain airbag 10. The gas duct 14 is provided with a substantially upper half section 11a of the front chamber 11, a substantially upper half section 12a of the rear chamber 12, and a passage section 14b that connects the substantially upper half sections.

The inflator 4 ejecting high-pressure gas into the gas duct 14 is connected to a substantially central section of the upper end of the gas duct 14. Below the gas duct 14, a secondary inflation section 15, into which the high-pressure gas that has passed through the gas duct 14 flows, is formed.

The secondary inflation section 15 is constituted by a substantially lower half section 11b of the front chamber 11 and a substantially lower half section 12b of the rear chamber 12.

When the inflator 4 is actuated, the high-pressure gas flows via the gas duct 14 into the secondary inflation section 15, thereby deploying and inflating the curtain airbag 10.

The first sub-chamber 21 and the second sub-chamber 22 are formed in the curtain airbag 10. The first sub-chamber 21 is formed at the upper end section 14a of the gas duct 14 to face the pillar garnish 5 corresponding to a center pillar (not shown in the figure) of the vehicle body 3. The second sub-chamber 22 is formed at the upper end section 14a of the gas duct 14 to face the pillar garnish 5 corresponding to a quarter pillar (not shown in the figure).

A communication path 13 by which the first sub-chamber 21 and the upper end section 14a of the gas duct communicate is formed therebetween. A communication path 13 by which the second sub-chamber 22 and the upper end section 14a of the gas duct communicate is formed therebetween. The high-pressure gas from the inflator 4 flows into the first and second sub-chambers 21, 22 through these communication paths 13. The sub-chambers 21, 22 and the communication paths 13 are formed integrally with the curtain airbag 10 by sewing or the like.

The two tab cloth strips 34, 35 and two auxiliary cloth strips 40 are provided alternately with an appropriate spacing at the upper end section of the curtain airbag 10. The first tab cloth strip 34 is provided in a position facing the center pillar to support and fix the gas duct 14 and the first sub-chamber 21. The second tab cloth strip 35 is provided in a position facing the quarter pillar to support and fix the gas duct 14 and the second sub-chamber 22. One auxiliary tab strip 40 is disposed in front the first tab cloth strip 34 and the other is disposed between the first tab cloth strip 34 and the second tab cloth strip 35 to ensure additional support and fixing of the curtain airbag 10.

Figure 3:
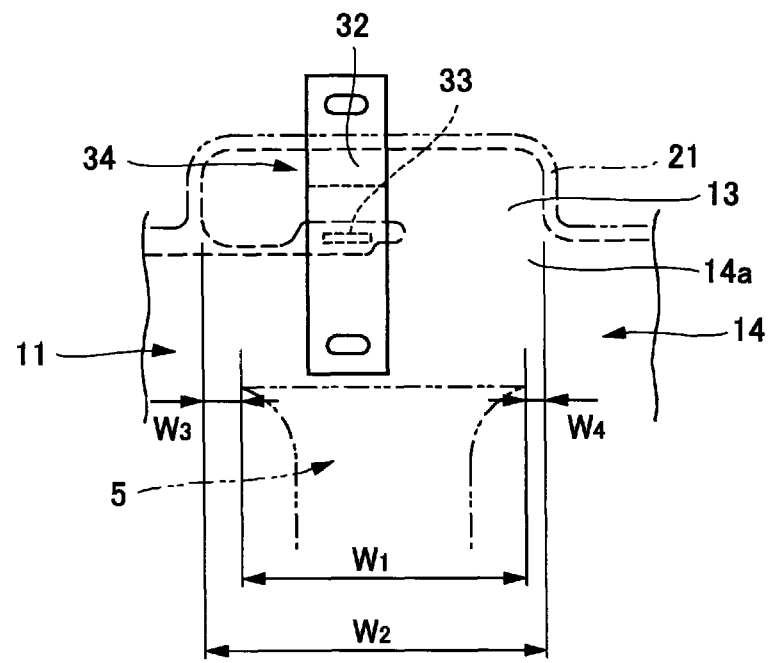
FIG. 3 is a plan view illustrating a state in which a tab cloth strip used in the curtain airbag device for a vehicle shown in FIG. 2 is attached to a curtain airbag.

FIG. 3 shows by way of example an attachment state of the first tab cloth strip 34 to the curtain airbag 10. The first tab cloth strip 34 has the anchoring section 33 formed therein that joins a substantially central portion of the first tab cloth strip between the first sub-chamber 21 and the upper end section 14a of the gas duct. The anchoring section 33 is a portion sewn on from the inside of the vehicle cabin. The tearing section 32 where the binding section 31 is torn by the inflation of the curtain airbag 10 is formed above the anchoring section 33. Similarly to the first tab cloth strip 34, the second tab cloth strip 35 has the anchoring section 33 formed therein that joins a substantially central portion of the second tab cloth strip between the second sub-chamber 22 and the upper end section 14a of the gas duct (this configuration is not shown in the figure). The tearing section 32 where the binding section 31 is torn is formed above the anchoring section 33. The tearing section 32 is a main slit line 32a cut as perforation in the longitudinal direction of the vehicle.

The first sub-chamber 21 and the second sub-chamber 22 are formed as bags of a substantially rectangular parallelepiped shape such that a length W2 in the longitudinal direction of the vehicle is larger than a width W1 of the pillar garnish 5 in the longitudinal direction of the vehicle, and a length in the vertical direction of the vehicle is less than that of the pillar garnish 5. More specifically, the first and second sub-chambers 21, 22 are disposed between a position protruding by a length W3 forward of the vehicle from the front end of the corresponding pillar garnish 5 to a position protruding by a length W4 rearward of the vehicle from the rear end of the pillar garnish 5. The lengths W3, W4 are preferably set to substantially equal values. It is more preferred that the two lengths W3, W4 be set to about 20 mm.

Figure 4:
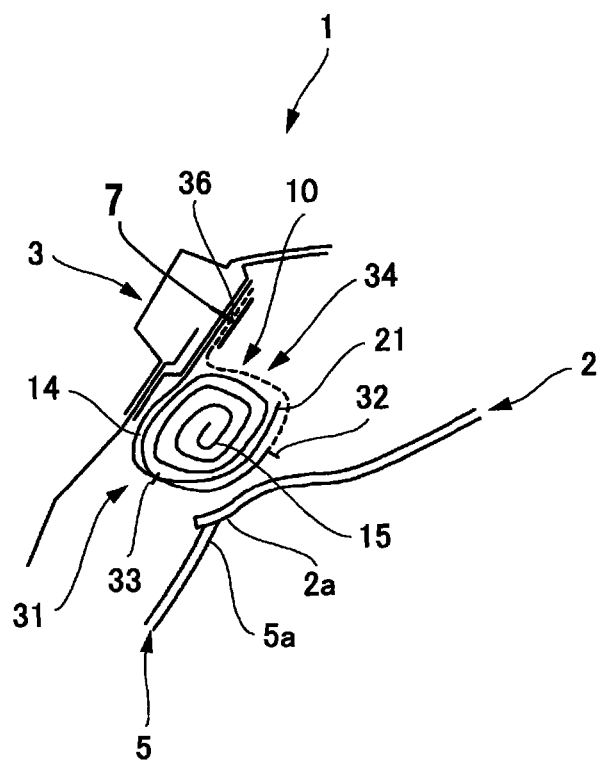
FIG. 4 is an enlarged cross-sectional view illustrating a state in which the curtain airbag device for a vehicle shown in FIG. 2 is attached to the vehicle body.

FIG. 4 shows by way of example a state in which the curtain airbag 10 bound by the first tab cloth strip 34 is attached to the vehicle body 3. The curtain airbag 10 is bound inside the first tab cloth strip 34 so that a draw-out direction faces outside the vehicle. More specifically, the curtain airbag 10 is wound about the secondary inflation section 15 and the gas duct 14 is wrapped around the outer side of the curtain airbag.

The first sub-chamber 21 is disposed adjacently to the wound curtain airbag 10 inside the first tab cloth strip 34. Attachment sections 36 fixed with a pin or a bolt 7 to the vehicle body 3 are formed at both ends of the first tab cloth strip 34 so as to be superimposed thereon. The attachment portions 36 assume an annular shape when fixed form the binding section 31 that binds the wound curtain airbag 10 and the first sub-chamber 21 adjacent thereto. The second tab cloth strip 35 also constitutes the binding section 31 of the curtain airbag 10 and the second sub-chamber 22 (this configuration is not shown in the figure).

The auxiliary cloth strip 40 has the anchoring section 33 formed therein that joins a substantially central portion of the auxiliary cloth to the upper end section of the curtain airbag 10. The anchoring section 33 is a portion sewn on from the inside of the vehicle cabin. The tearing section 32 is formed above the anchoring section 33. The tearing section 32 is a main slit line 32*a* cut as perforation in the longitudinal direction of the vehicle. The wound curtain airbag 10 is disposed on the inside of the auxiliary cloth strip 40. Attachment sections 36 fixed with a pin or a bolt 7 to the vehicle body 3 are formed at both ends of the auxiliary cloth strip 40 so as to be superimposed thereon. The binding section 31 that binds the wound curtain airbag 10 is formed by the attachment sections 36 that assume an annular shape when fixed.

Figure 5:
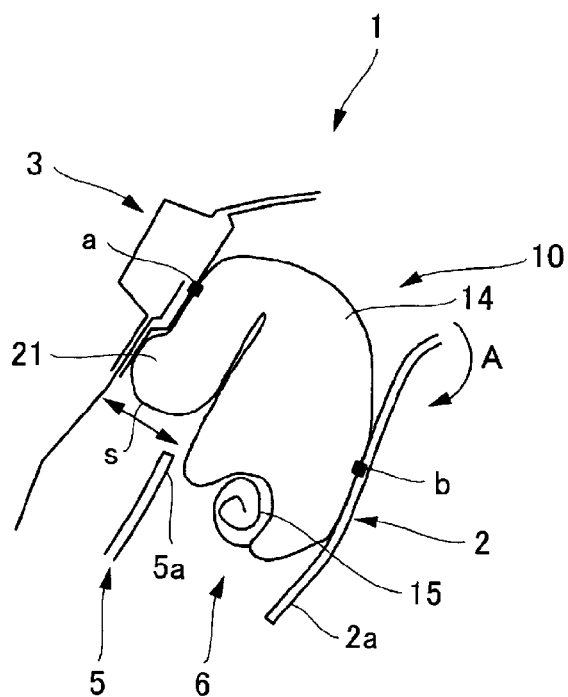
FIG. 5 is an enlarged cross-sectional view illustrating the inflation and deployment of the curtain airbag device for a vehicle shown in FIG. 2.

FIG. 5 shows by way of example the curtain airbag 10 and the first sub-chamber 21 in the process of deployment. The length of the first sub-chamber 21 in the inflated state in the transverse direction of the vehicle is larger than a gap S between the vehicle body 3 and the pillar garnish 5. As a result, the inflated first sub-chamber 21 pushes the curtain airbag 10 toward the interior side of the vehicle cabin.

The first sub-chamber 21 is provided in a deployment and inflation position above the pillar garnish upper end section 5*a*. As a result, the first sub-chamber 21 is not introduced into the gap S and does not block the gap. Moreover, this first sub-chamber does not apply pressure to the pillar garnish 5.

The first tab cloth strip 34 fixed with the attachment section 36 to the vehicle body 3 anchors the first sub-chamber 21 and the curtain airbag 10 to the vehicle body 3 by the anchoring section 33. Because of such anchoring, the first sub-chamber 21 and the curtain airbag 10 are prevented from rotating (in the direction A in the figure) during deployment. Because of such a restriction, the first sub-chamber 21 and the curtain airbag 10 are positioned side by side in the transverse direction of the vehicle, the former outside the vehicle and the latter inside the vehicle cabin. In this state, the curtain airbag 10 deploys downward of the opening 6. The same is true for the position of the second tab cloth strip 35 (this configuration is not shown in the figure).

The operation of the curtain airbag device 1 for a vehicle according to the first embodiment will be explained below.

When the curtain airbag 10 is fabricated, the inflator 4 is connected to a substantially central portion of the upper end of the curtain airbag 10, the anchoring section 33 is formed between the first sub-chamber 21 and the gas duct 14 by joining the first tab cloth strip 34 from inside the vehicle cabin, and the anchoring section 33 is formed between the second sub-chamber 22 and the gas duct 14 by joining the second tab cloth strip 35 from inside the vehicle cabin. The anchoring section 33 is also formed by joining the auxiliary cloth strip 40 to the upper end section of the curtain airbag 10 from inside the vehicle cabin.

The attachment of the curtain airbag 10 to the vehicle body 3 is explained below. In a state in which the first tab cloth strip 34 is located on the exterior side, the first sub-chamber 21 is disposed on the vehicle exterior side of the anchoring section 33, and the curtain airbag 10 is disposed on the vehicle cabin interior side of the anchoring section 33. In this state, the curtain airbag 10 is wound from the secondary inflation section 15 side toward the gas duct 14. The wound curtain airbag 10 and the first sub-chamber 21 adjacent thereto are bound by the first tab cloth strip 34 and the binding section 31 is formed. The attachment section 36 superimposed on the upper end section and lower end section of the first tab cloth strip 34 is attached to the vehicle body 3. A similar operation is performed with respect to the second tab cloth strip 35. Thus, the wound curtain airbag 10 and the second sub-chamber 22 are bound by the binding section 31. The attachment section 36 is attached to the vehicle body 3. A similar operation is performed with respect to the auxiliary cloth strip 40. The wound curtain airbag 10 is bound by the binding portion 31. The attachment section 36 superimposed on the upper end section and lower end section of the auxiliary cloth strip 40 is attached to the vehicle body 3.

Figure 6:
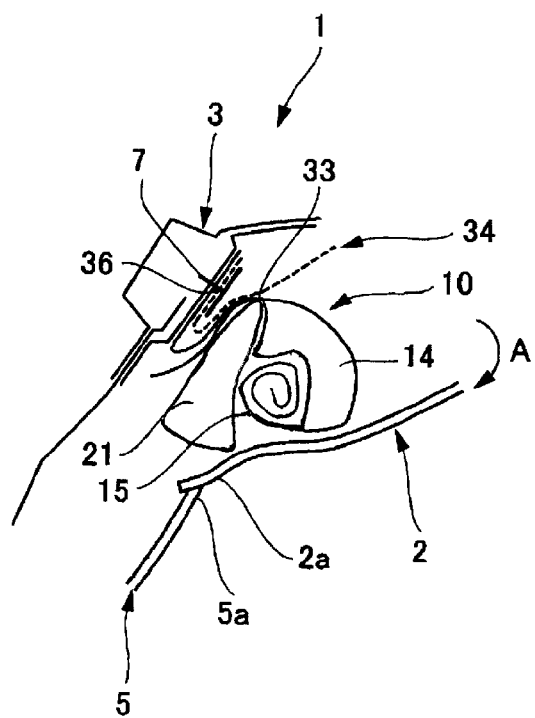
FIG. 6 is an enlarged cross-sectional view illustrating the first step of the inflation and deployment action of the curtain airbag device for a vehicle shown in FIG. 2.
Figure 7:
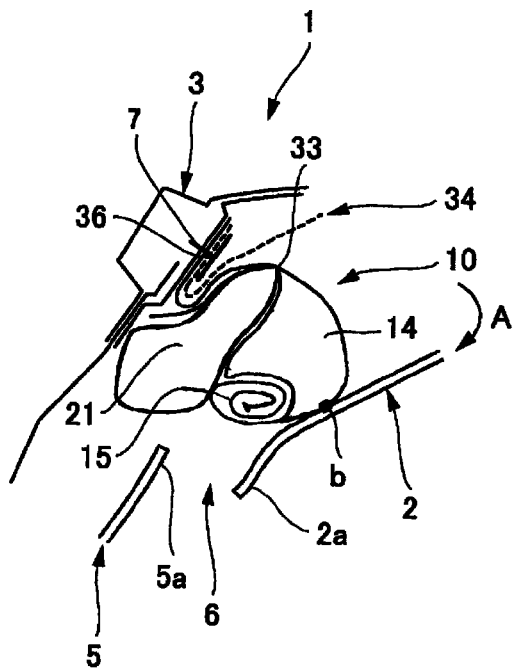
FIG. 7 is an enlarged cross-sectional view illustrating the second step of the inflation and deployment action of the curtain airbag device for a vehicle shown in FIG. 2.

FIGS. 6 to 10 show by way of example the deployed state of the curtain airbag 10 on the circumference of the first tab cloth strip 34 when the inflator 4 is actuated. When the inflator 4 is actuated, as shown in FIG. 6, the gas duct 14 and the first sub-chamber 21 start inflating due to ejection of the high-temperature gas. When the inflation starts, the tearing section 32 in the binding section 31 of the first tab cloth strip 34 is torn. As a result, the bound state of the binding section 31 is canceled.

When the inflation starts, the curtain airbag 10 and the first sub-chamber 21 rotate in the direction of arrow A. However, as shown by way of example in FIG. 7, since the attachment section 36 is fixed to the vehicle body 3 and because of attachment performed by the anchoring section 33, the rotation of the curtain airbag 10 and the first sub-chamber 21 in the direction of arrow A is restricted. As a result, the first sub-chamber 21 inflates on the vehicle exterior side of the curtain airbag 10 and pushes the gas duct 14 toward the interior side of the vehicle cabin. The pushed-out gas duct 14 applies pressure to the head lining side edge 2*a*. The head lining 2 is separated by the applied pressure from the pillar garnish upper end section 5*a*. As a result, the downward opening 6 is formed between the head lining 2 and the pillar garnish upper end section 5*a*. Simultaneously with the rotation in the direction of arrow A, the curtain airbag 10 for which the bound state has been canceled moves toward the interior side of the vehicle cabin. The amount of this movement is also restricted in a similar manner.

Since the rotation in the direction of arrow A is restricted, the first sub-chamber 21 that is being deployed and inflated and the secondary inflation section 15 of the curtain airbag 10 are disposed side by side in the transverse direction of the vehicle, the first sub-chamber 21 being on the vehicle exterior side. In addition, since the first sub-chamber 21 is inflated to a size larger than the width of the gap S, the gas duct 14 and the secondary inflation section 15 are pushed toward the interior side of the vehicle cabin to a position in which they are not caught by the pillar garnish 5.

Figure 8:
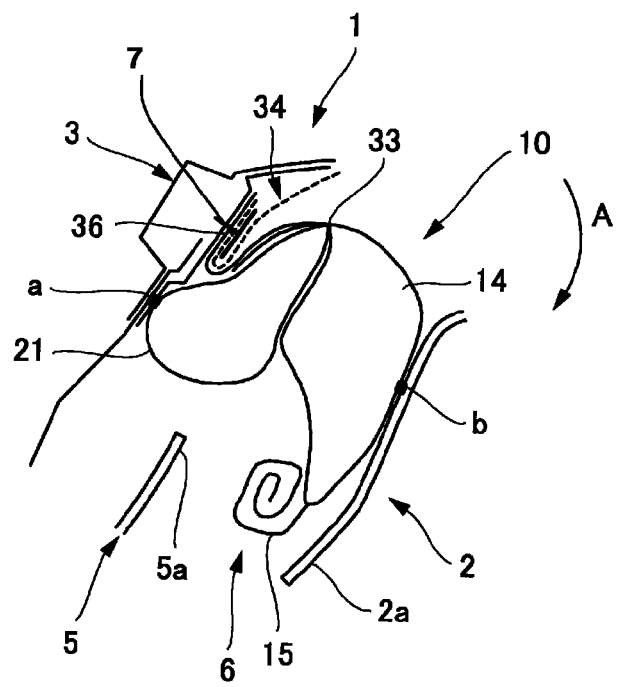
FIG. 8 is an enlarged cross-sectional view illustrating the third step of the inflation and deployment action of the curtain airbag device for a vehicle shown in FIG. 2.

As shown in FIG. 8, in a state in which the rotation in the direction of arrow A is restricted by the anchoring section 33 and the attachment section 36 of the first tab cloth strip 34, the first sub-chamber 21 and the curtain airbag 10 pushed toward the interior side of the vehicle cabin are acted upon by a pressure from the vehicle body 3 in a point "a" of the first sub-chamber 21 and a pressure from the head lining 2 in a point "b" of the curtain airbag 10. As a result, an arch-like tension is generated between "a" and "b". As a consequence, the deployment direction of the curtain airbag 10 from the opening 6 can be controlled in the downward direction.

Figure 9:
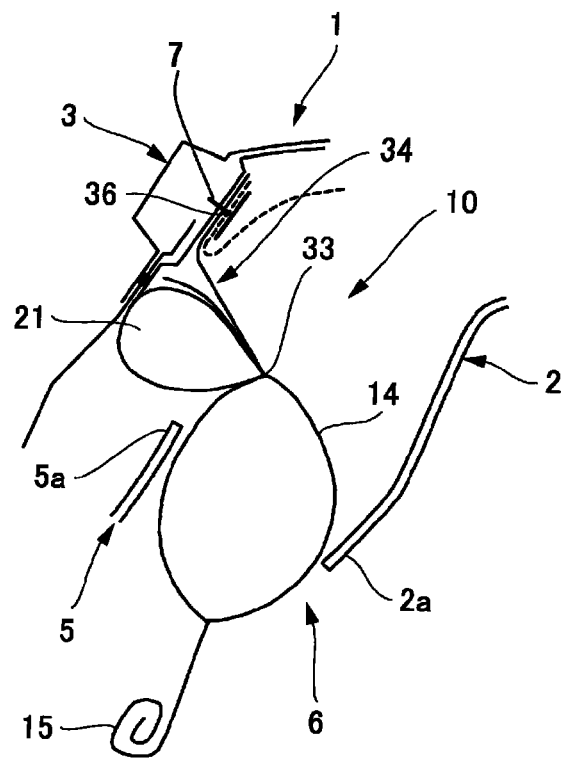
FIG. 9 is an enlarged cross-sectional view illustrating the fourth step of the inflation and deployment action of the curtain airbag device for a vehicle shown in FIG. 2.

As shown by way of example in FIG. 9, in the curtain airbag 10 with a restricted deployment direction, the undeployed secondary inflation section 15 is positioned on the lower side and the inflated gas duct 14 continuous applying pressure to the head lining side edge 2*a*. As a result, the secondary inflation section 15 deploys and inflates downward.

A similar process takes place in the position of the second tab cloth strip 35.

In the curtain airbag 10 inside the auxiliary cloth strip 40, the deployment direction is similarly restricted to the downward direction.

In the curtain airbag device 1 for a vehicle according to the first embodiment, the curtain airbag 10 can be prevented from being caught by the pillar garnish 5 and the deployment direction of the curtain airbag 10 can be restricted during deployment and inflation by using the tab cloth strips 34, 35, that is, a lightweight, simple and inexpensive structure.

In the curtain airbag device 1 for a vehicle according to the first embodiment, the curtain airbag 10 is pushed toward the interior side of the vehicle cabin by the sub-chambers 21, 22 inflated on the exterior side of the vehicle, while the rotation in the direction of arrow A is restricted by the attachment section 36 fixing the tab cloth strips 34, 35 to the vehicle and the anchoring section 33 anchoring the curtain airbag 10. As a result, the curtain airbag 10 can be deployed and inflated smoothly downward from the opening 6.

In particular, in the course of inflation and deployment, the sub-chamber 21, 22 and the curtain airbag 10 are disposed side by side in the transverse direction of the vehicle. As a result, the secondary inflation section 15 that has been wound on the central side of the curtain airbag 10 can be smoothly deployed downward.

The length of the sub-chamber 21, 22 during inflation in the transverse direction of the vehicle is set longer than the gap S between the pillar garnish 5 and the vehicle body 3. As a result, the deploying and inflating curtain airbag 10 is prevented from being caught by the pillar garnish 5. The deploying and inflating sub-chambers 21, 22 are disposed above the pillar garnish upper end section 5a. As a result, the sub-chambers 21, 22 can be prevented from penetrating into and closing the gap S. Therefore, the sub-chambers 21, 22 can be prevented from applying pressure to the pillar garnish 5 and the pillar garnish 5 itself is prevented from protruding inside the vehicle cabin. As a result, the pillar garnish 5 is prevented from being broken and scattered.

The length W2 of the sub-chambers 21, 22 in the longitudinal direction of the vehicle is set larger than the length W1 of the pillar garnish 5 in the longitudinal direction of the vehicle. As a result, the sub-chambers 21, 22 deploy so as to cover the entire length W1 of the pillar garnish 5 in the longitudinal direction of the vehicle above the gap S. As a result, the curtain airbag 10 pushed toward the interior side of the vehicle cabin can be prevented from being caught by the pillar garnish 5.

Since the sub-chambers 21, 22 are disposed from the position protruding by the length W3 forward of the vehicle from the front end of the corresponding pillar garnish 5 to a position protruding by a length W4 rearward of the vehicle from the rear end of the pillar garnish 5, the reliability of preventing the sub-chambers from being caught by the pillar garnish 5 can be increased.

The curtain airbag 10 that tends to rotate in the direction of arrow A when the inflator 4 is actuated is restricted by the anchoring sections 33 and the attachment sections 36 of the tab cloth strips 34, 35. In addition, the curtain airbag 10 is wound so that the draw-out direction thereof faces the vehicle exterior side. As a result, the secondary inflation section 15 can be smoothly deployed downward from the opening 6.

In the first embodiment, two sub-chambers, namely, the first sub-chamber 21 and the second sub-chamber 22, are provided. However, the number of sub-chambers is not limited to two. Likewise, the number of tab cloth strips binding the sub-chambers together with the curtain airbag 10 is also not limited to two.

In the first embodiment, the case is explained in which the curtain airbag 10 accommodated in a folded state is wound so that the draw out direction thereof faces the vehicle exterior side, but such a configuration is not limiting and the curtain airbag may be wound so that the draw out direction thereof faces the vehicle interior side. Furthermore, the curtain airbag may be folded for example as an accordion.

In the first embodiment, the binding sections 31 that bind together the curtain airbag 10 and the sub-chambers 21, 22 are formed by the tab cloth strips 34, 35 having the attachment sections 36 fixed at both ends to assume an annular shape. However, such a shape of the attachment sections 36 and binding sections 31 is not limiting. For example, the attachment section 36 may be also formed at one end of the tab cloth strips 34, 35. Further, the binding section 31 may be also formed by sewing together the tab cloth strips 34, 35 to obtain an annular shape.

In the first embodiment, the sub-chambers 21, 22 and communication path 13 are formed integrally with the curtain airbag 10 by sewing. However, the sub-chambers 21, 22 may be formed separately from the curtain airbag 10 and attached to the curtain airbag 10 with the communication path 13 being interposed therebetween.

In the first embodiment, the anchoring section 33 is formed by joining the tab cloth strips 34, 35 between the sub-chambers 21, 22 and the gas duct upper end section 14a. However, the formation position of the anchoring section 33 is not limited to that between the sub-chambers 21, 22 and the gas duct upper end section 14a. For example, the anchoring section may be at the sub-chambers 21, 22 side and at the gas duct 14 side.

The first variation example of the curtain airbag device 1 according to the first embodiment will be explained below.

Figure 10:
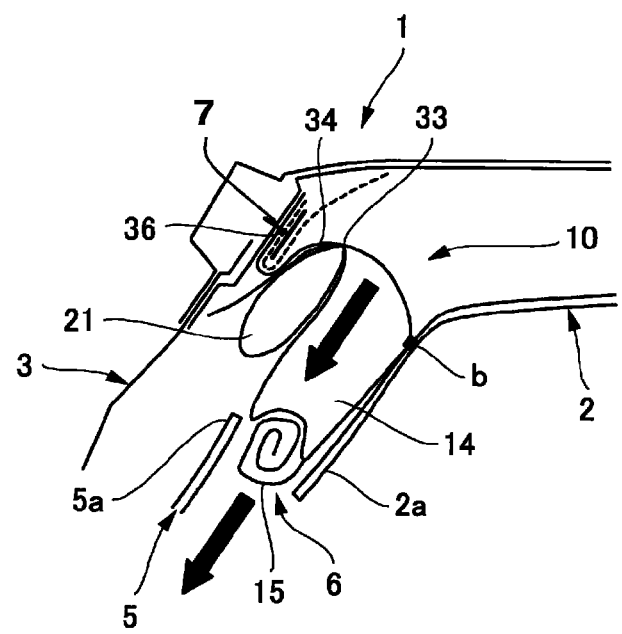
FIG. 10 is an enlarged cross-sectional view illustrating a first embodiment of the curtain airbag device for a vehicle in accordance with the present invention.

In the first variation example, as shown in FIG. 10, the length between the attachment section 36 and the anchoring section 33 is decreased. As a result, the movement position of the curtain airbag 10 is below that shown by way of example in FIG. 6. As a result, the point "b" in which the curtain airbag 10 abuts on the head lining 2 is above the curtain airbag 10. As a result, the curtain airbag 10 can be deployed and inflated more along the side glass.

The second variation example of the curtain airbag device 1 according to the first embodiment will be explained below.

Figure 11:
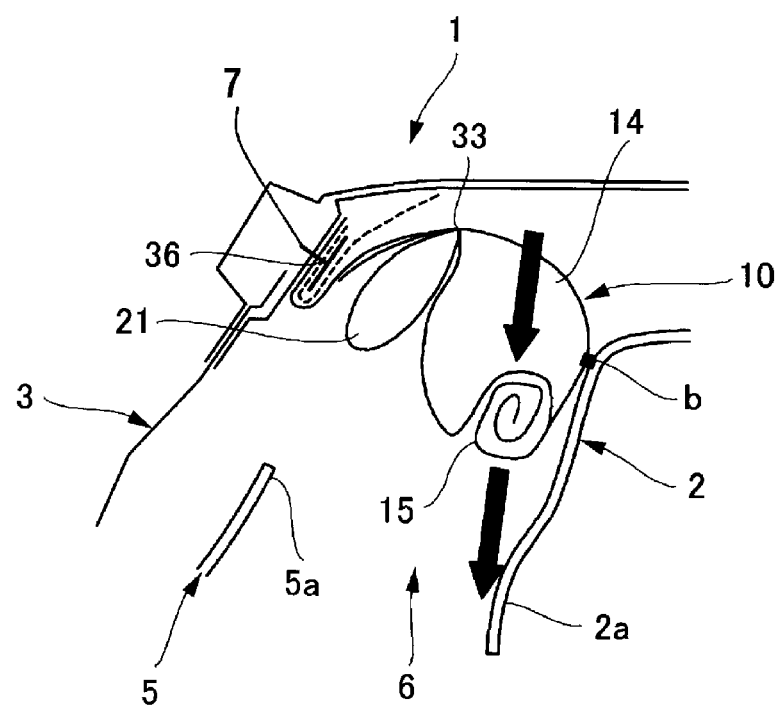
FIG. 11 is an enlarged cross-sectional view illustrating a second embodiment of the curtain airbag device for a vehicle in accordance with the present invention.

In the second variation example, as shown in FIG. 11, a length between the attachment section 36 and the anchoring section 33 is set larger than that in the first embodiment. As a result, the movement position of the curtain airbag 10 is above that in the example shown in FIG. 6. As a consequence, the point "b" assumes a position below the curtain airbag 10. Thus, the curtain airbag 10 can be deployed and inflated further downward. Thus, by setting the length between the attachment section 36 and the anchoring section 33, it is possible to adjust easily the deployment direction, without changing the length of the first tab cloth strip 34 and the second tab cloth strip 35.

The third variation example of the curtain airbag device 1 for a vehicle according to the first embodiment will be explained below.

Figure 12:
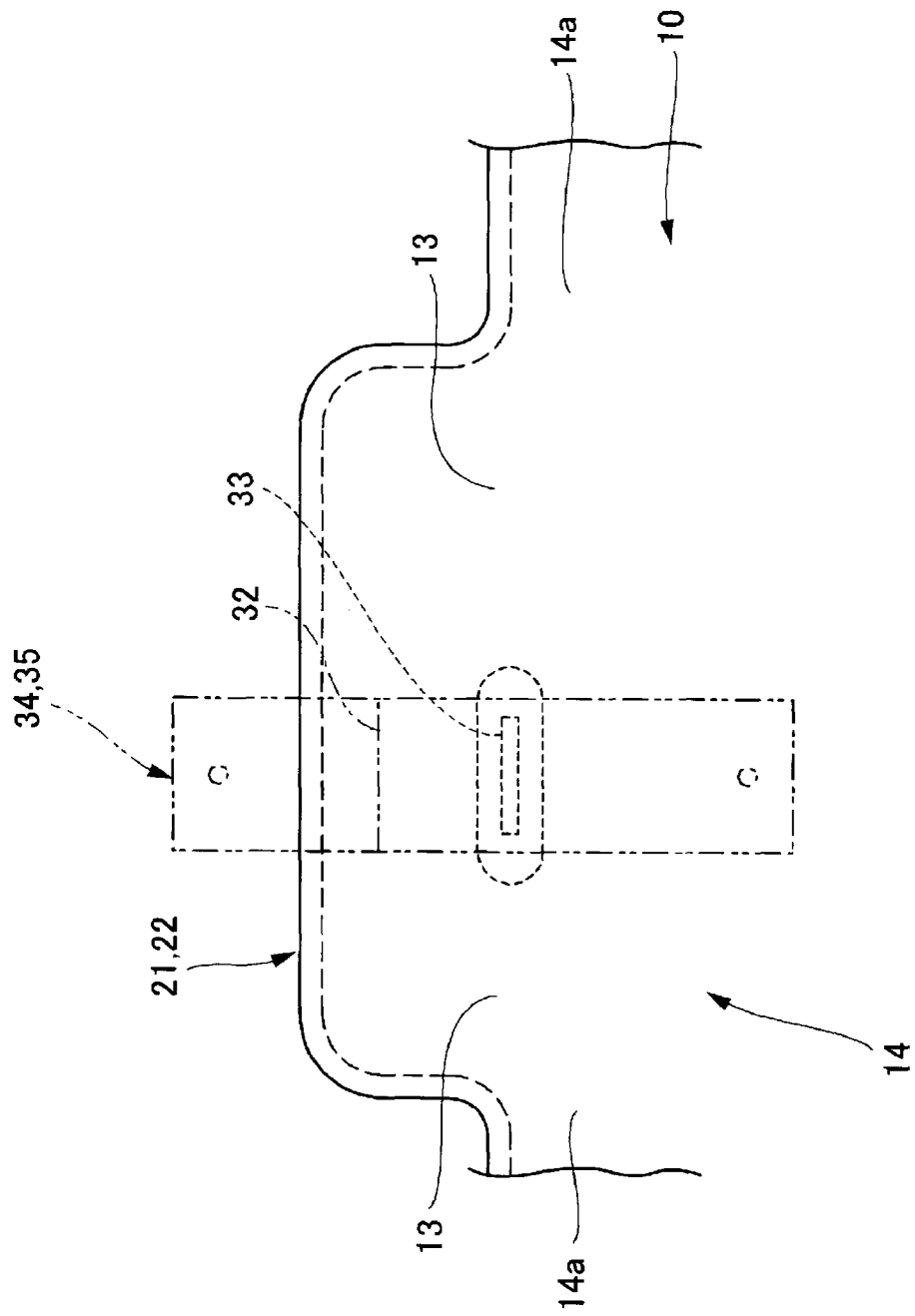
FIG. 12 is an enlarged plan view of a sub-chamber periphery illustrating a third embodiment of the curtain airbag device for a vehicle in accordance with the present invention.

In the third variation example, as shown in FIG. 12, two communication paths 13 connecting the sub-chambers 21, 22 and the curtain airbag 10 are formed on the left and right sides from the center. As a result, the high-pressure gas flows at a higher rate into the sub-chambers 21, 22. Therefore, the sub-chambers 21, 22, can be inflated faster and the tearing time of the first tab cloth strip 34 and the second tab cloth strip 35 can be shortened. Further, in the third variation example, the pressure increase ratio of the sub-chambers 21, 22 is high and therefore such a configuration is effective when the head lining 2 having a high strength is deformed.

In the third variation example, two communication paths 13 are provided on the left and right side from the center. However, the communication paths 13 may be set in any position. Further, the number of communication paths may be larger than two.

The fourth variation example of the curtain airbag device 1 for a vehicle according to the first embodiment will be explained below.

The curtain airbag 10 has sub-chambers 21, 22 formed therein that are folded together with the curtain airbag and are disposed adjacently thereto. The curtain airbag 10 includes a gas duct 14 connected to the inflator 4 and having high-pressure gas introduced therein by the action of the inflator 4 and a secondary inflation section 15 that is inflated by the high-pressure gas flowing in from the gas duct 14. The sub-chambers 21, 22 are provided with a communication path 13 connecting the sub-chambers with the gas duct 14. As a result, the sub-chambers 21, 22 and the secondary inflation section 15 are inflated in a state of being parallel to each other in a transverse direction of the vehicle, the sub-chambers 21, 22 being positioned on the vehicle exterior side. The gas duct 14 is inflated between the sub-chambers 21, 22 and the secondary inflation section 15. As a result, the secondary inflation section 15 is pushed toward the interior side of the vehicle cabin by the sub-chambers 21, 22 and the gas duct 14.

The gas duct 14 of the fourth variation example is formed such that when the inflator 4 is actuated, the amount of high-pressure gas introduced into the gas duct is larger than that in the example shown in FIGS. 2 and 3. This feature may be realized by forming a larger gas duct 14 or smaller sub-chambers 21, 22.

Figure 16:
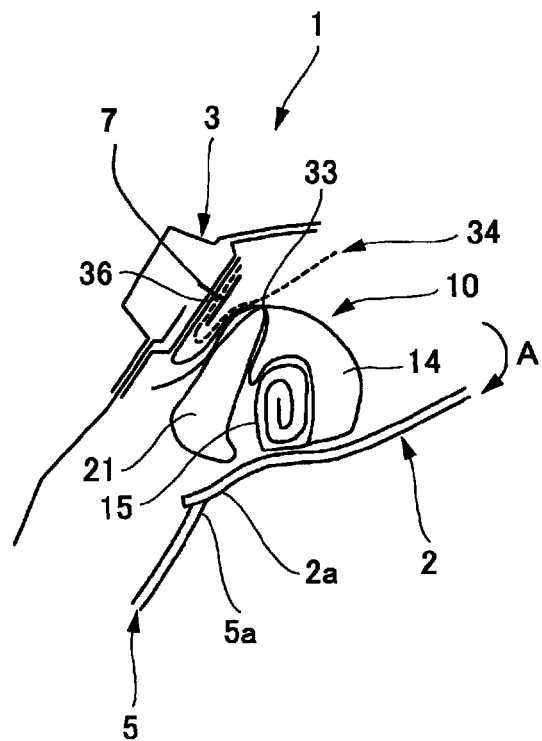
FIG. 16 is a principal enlarged cross-sectional view representing an initial stage of deployment and inflation illustrating the fourth embodiment of the curtain airbag device for a vehicle in accordance with the present invention.
Figure 17:
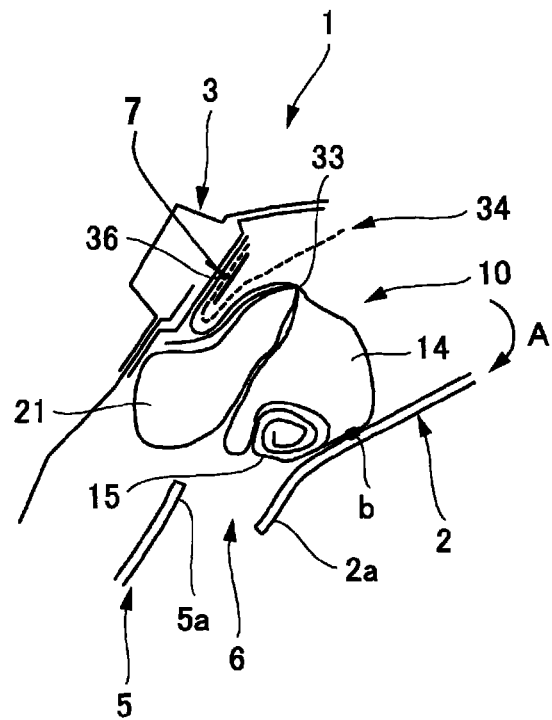
FIG. 17 is a principal enlarged view illustrating an advanced stage of deployment and inflation in the curtain airbag device for a vehicle shown in FIG. 16.

When the inflator 4 is actuated, the sub-chambers 21, 22 are inflated on the vehicle exterior side of the curtain airbag 10. In this case, as shown by way of example in FIGS. 16 and 17, the gas duct 14 that is being inflated penetrates between the first sub-chamber 21 and the secondary inflation section 15 that are arranged in a row in the transverse direction of the vehicle. As a result, in the course of inflation and deployment, the first sub-chamber 21, gas duct 14, and secondary inflation section 15 are inflated in a state of being parallel to each other. The gas duct 14 is pushed by the first sub-chamber 21 toward the interior side of the vehicle cabin and applies pressure to the head lining side edge 2a. As a result, the secondary inflation section 15 deploys from the opening 6 toward the interior side of the vehicle cabin. The same is true for the circumference of the second sub-chamber 22 (this process is not illustrated by the figures).

The length of the sub-chambers 21, 22 and the gas duct 14 in the transverse direction of the vehicle in the deployment and inflation process is larger than the width of a gap S between the vehicle body 3 and the pillar garnish 5.

In the fourth variation example, in the inflation and deployment process, the gas duct 14 penetrates between the sub-chambers 21, 22 and the secondary inflation section 15 and applies pressure to the head lining side edge 2a. As a result, the secondary inflation section 15 can be more smoothly deployed from the opening 6.

Since the sub-chambers 21, 22 and the gas duct 14 are inflated and deployed to a size equal to or greater than the width of the gasp S, the secondary inflation section 15 that is deployed toward the interior side of the vehicle cabin can be prevented from being caught by the pillar garnish 5.

A variation example of the tab cloth strips 34, 35 used in the curtain airbag device 1 for a vehicle according to the first embodiment will be explained below.

In this variation example, the tearing section 32 is composed of one main slit line 32a that is formed in the tab cloth strips 34, 35 and a sub-slit line 32b formed on the circumference of the main slit line 32a.

Figure 13:
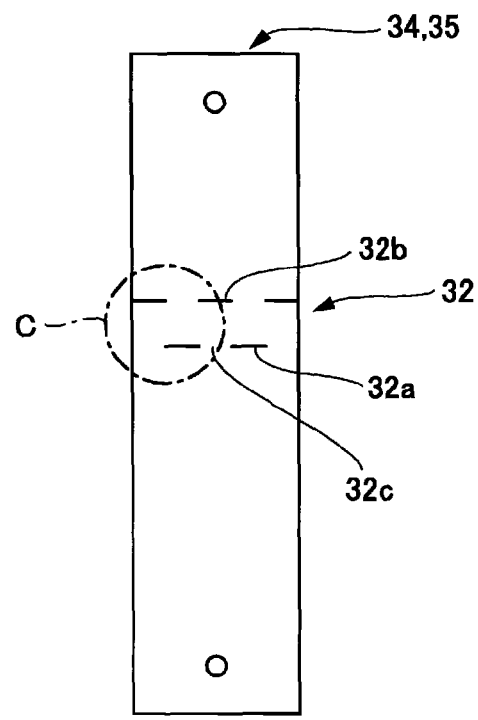
FIG. 13 is a plan view illustrating an alternative embodiment of the tab cloth strip used in the curtain airbag device for a vehicle in accordance with the present invention.

As shown by way of example in FIG. 13, the main slit line 32a is formed by cutting in the form of perforation along a straight line in the lateral direction of the tab cloth strips 34, 35. One sub-slit line 32b that is substantially parallel to the main slit line 32a is formed above the main slit line 32a.

The sub-slit line 32b is formed as perforation that is cut only in the portion directly above an uncut-section 32c of the main slit line 32a.

Figure 14:
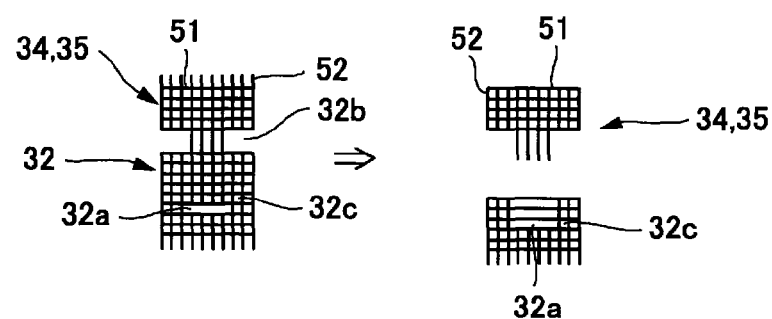
FIG. 14 is an enlarged view of a "C" portion illustrating an example of an operation in the alternative embodiment shown in FIG. 13.

An example of the present variation example will be explained below. FIG. 14 is an enlarged view of a section "C" of the tab cloth strips 34, 35 composed of warps 51 and woofs 52. The main slit line 32a is formed in the tab cloth strips 34, 35, and the sub-slit line 32b is formed above the main slit line 32a at a predetermined distance therefrom in the vertical direction. As a result, the warps 51 are arranged as portions cut by the main slit line 32a and portions cut by the sub-slit line 32b, the length thereof changing alternately. These warps 51 are held by the woofs 52. Such a structure weakens the tearing section 32 and makes it easy to tear.

Figure 15:
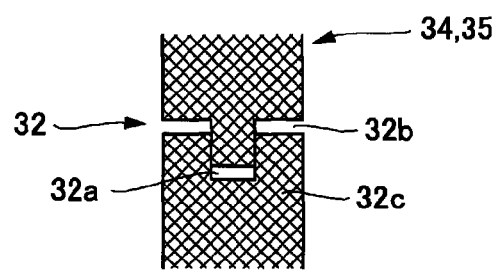
FIG. 15 is an enlarged view of a "C" portion illustrating another embodiment of the embodiment shown in FIG. 13.

Another example of the present variation example will be explained below. FIG. 15 is an enlarged view of a section "C" of the tab cloth strips 34, 35 composed of threads crossing each other in the bias direction. In this case, the cut sections are also formed alternately in the lateral direction by the main slit line 32a and sub-slit line 32b in the tab cloth strips 34, 35. Such a structure weakens the tearing section 32 and makes it easy to tear.

In the above-described embodiment, the tearing section 32 is formed on one main slit line 32a cut in the form of perforation, or by one main slit line 32a and sub-slit line 32b cut in the form of perforation. However, the main slit line 32a and the sub-slit line 32b may be in the form other than that of perforation. The number of sub-slit lines 32b is not limited to one and a plurality of sub-slit lines may be formed. The form of the tearing section 32 is also not limited to the above-described examples. For example, the entire tearing section 32 can be formed as a thin cloth or may have other form.

The second embodiment of the curtain airbag device 1 for a vehicle in accordance with the present invention will be explained below in greater detail with reference to the appended drawings. The curtain airbag device 1 for a vehicle of the second embodiment basically includes a curtain airbag 10 attached to a vehicle body 3 and accommodated between a side edge 2a of a head lining 2 and the vehicle body 3 along the side edge 2a. The curtain airbag 10 is inflated by high-pressure gas introduced from an inflator 4 connected thereto and applies pressure to the head lining side edge 2a. As a result, the head lining side edge 2a is separated from a pillar garnish upper end portion 5a and a downward opening 6 is formed therebetween. The curtain airbag 10 is deployed and inflated from the opening 6 toward the interior side of the vehicle cabin.

The curtain airbag 10 has sub-chambers 21, 22 formed therein that are folded together with the curtain airbag and disposed adjacently to the curtain airbag 10. The sub-chambers 21, 22 have a communication path 13 formed therein that connects the sub-chambers to the curtain airbag 10. The sub-chambers 21, 22 and the curtain airbag 10 are inflated in a state of being parallel to each other in the transverse direction of the vehicle by high-pressure gas introduced from the inflator 4. The sub-chambers 21, 22 are deployed and inflated on the vehicle exterior side of the curtain airbag 10, thereby pushing the curtain airbag 10 toward the interior side of the vehicle cabin. Only the difference between the second embodiment and the first embodiment will be described below.

Figure 18:
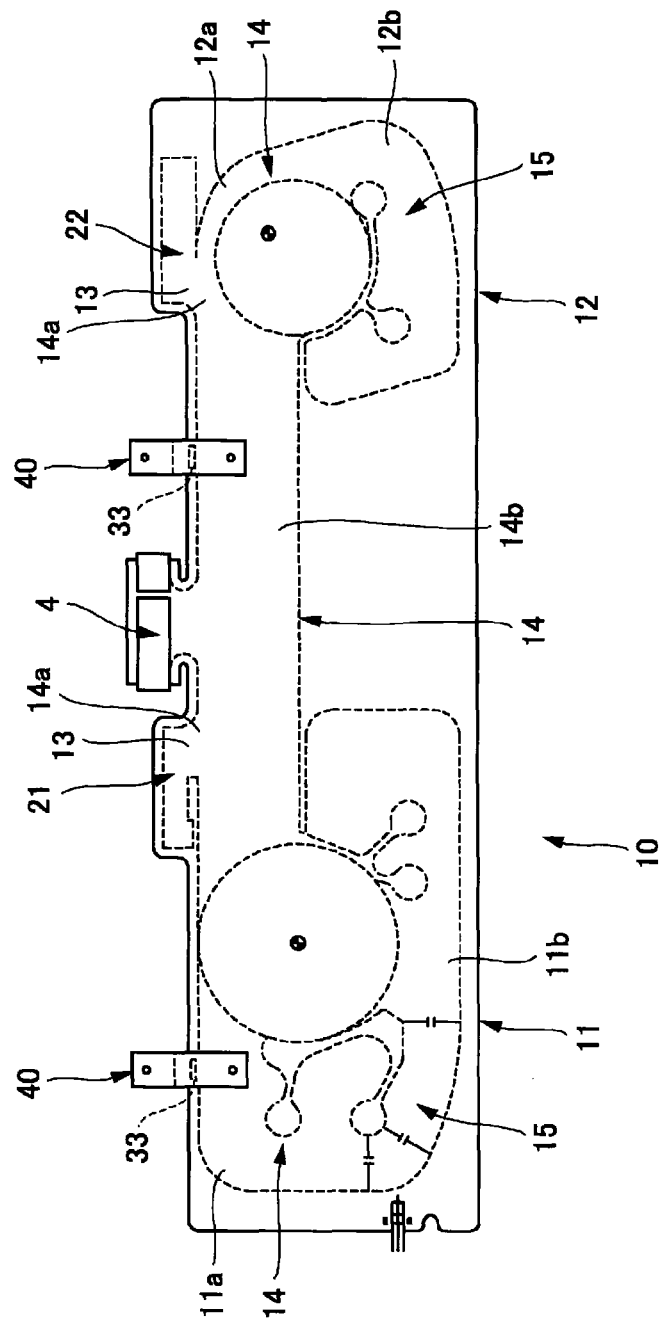
FIG. 18 is a plan view of a deployed state illustrating the second embodiment of the curtain airbag device for a vehicle in accordance with the present invention.
Figure 19:
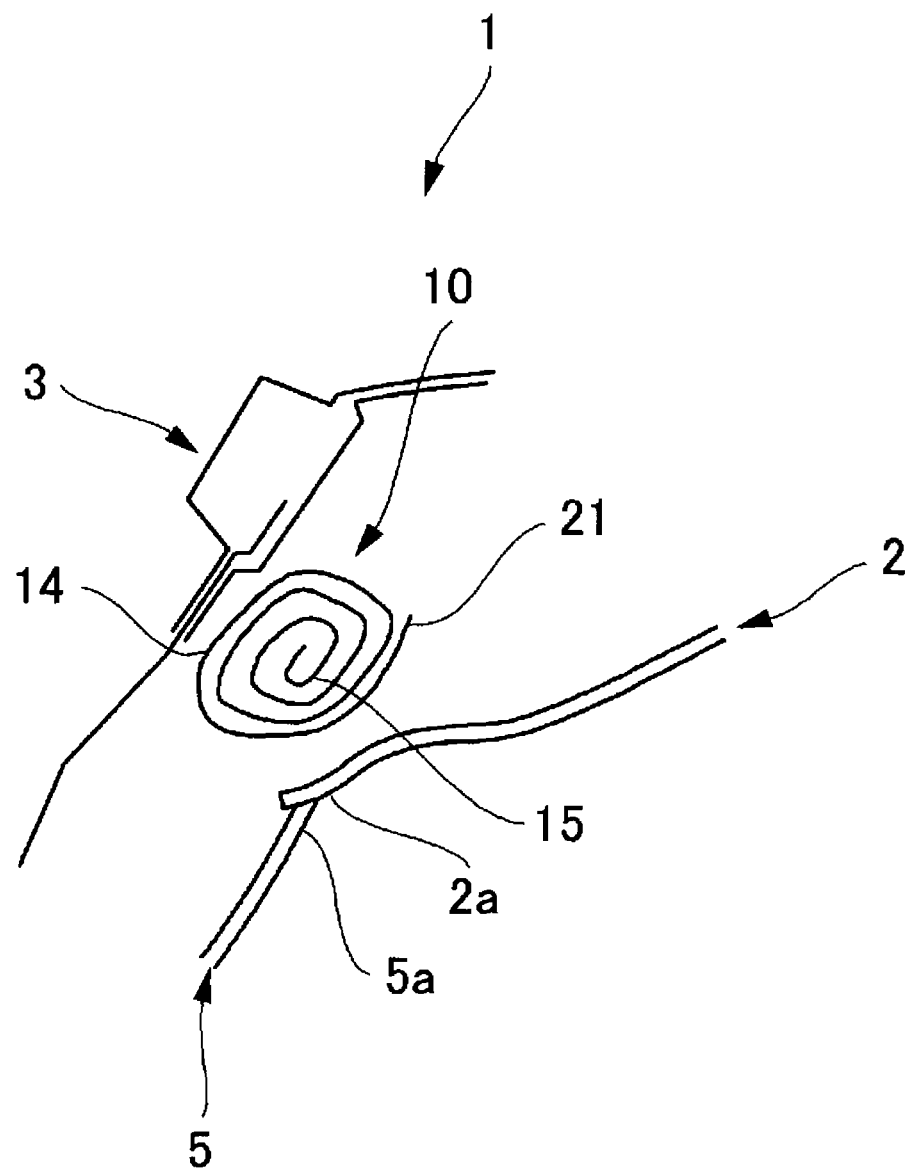
FIG. 19 is a principal enlarged cross-sectional view illustrating a state in which the curtain airbag device for a vehicle shown in FIG. 18 is attached to the vehicle body.

In the second embodiment, the curtain airbag 10 is attached to the vehicle body 3 by a well-known conventional method. An example of the method for attaching to the vehicle body 3 in which the curtain airbag 10 is provided with an auxiliary cloth strip 40 is shown in FIG. 18. Two auxiliary cloth strips 40 are attached to the curtain airbag 10, but the number of auxiliary cloth strips 40 may be other than two. The auxiliary cloth strip 40 is provided only with an attachment section 36 and an anchoring section 33.

The curtain airbag 10 is folded, bound, and accommodated between the head lining 2a and the vehicle body 3. A typical well-known member such as a tape is used for binding.

When the inflator 4 is actuated, the sub-chambers 21, 22 are inflated on the vehicle exterior side of the curtain airbag 10. In this case, the sub-chambers 21, 22 and the curtain airbag 10 are inflated in a state of being parallel to each other in the transverse direction of the vehicle. As a result, the curtain airbag 10 is pushed toward the interior side of the vehicle cabin by the sub-chambers 21, 22 and applies pressure to the head lining side edge 2a.

In the present embodiment, the curtain airbag 10 is attached to the vehicle body 3. Therefore, when the inflator 4 is actuated, the curtain airbag 10 is prevented from rotating in the direction of arrow A, and the sub-chambers 21, 22 and the curtain airbag 10 inflate in a state of being parallel to each other. As a result, a secondary inflation section 15 of the curtain airbag 10 can be deployed downward from the opening 6.

In the second embodiment, the curtain airbag 10 is attached to the vehicle body 3 by the auxiliary cloth strip 40, but other well-known conventional methods may be also used.

Further, in the case of the second embodiment, where a large amount of high-pressure gas is introduced in the gas duct 14 when the inflator 4 is actuated, in the course of the deployment and inflation process, the gas duct 14 penetrates between the sub-chambers 21, 22 and the secondary inflation section 15 that are arranged in a row in the transverse direction of the vehicle. As a result, the sub-chambers 21, 22, gas duct 14, and secondary inflation section 15 are inflated in a state of being parallel to each other. As a consequence, the sub-chambers 21, 22 push the gas duct 14 toward the interior side of the vehicle cabin, the gas duct 14 applies pressure to the head lining side edged 2a, and the secondary inflation section 15 is deployed from the opening 6 toward the interior side of the vehicle cabin.

The above-described curtain airbag device for a vehicle is a preferred example embodiment of the present invention, but other embodiments can be also implemented or realized by a variety of methods. In particular, the present invention is not limited to the shape, size, and arrangement of components that are illustrated in detail by the appended drawings, provided that no restrictive essential description relating thereto is included in the detailed description of the present application. Further, the expressions and terms used in the detailed description of the present application are for explanation purpose only and are not restrictive, provided that no restrictive essential description relating thereto is included.

The invention claimed is:

1. A curtain airbag device for a vehicle, comprising:
a curtain airbag configured to be attached to a vehicle between a head lining side edge and a vehicle body along the head lining side edge,
an inflator that introduces high-pressure gas to the curtain airbag to inflate the airbag, wherein, when the curtain airbag is inflated, the airbag applies pressure to the head lining side edge and causes the head lining side edge to separate from a pillar garnish upper end section, the airbag being is deployed from a downward opening, formed between the head lining side edge and the pillar garnish upper end section, and toward the interior side of a vehicle cabin,
wherein the curtain airbag has a sub-chamber formed therein that is folded together with the curtain airbag, the sub-chamber being disposed adjacently thereto, the sub-chamber being deployed and inflated on the vehicle exterior side of the curtain airbag by the high-pressure gas introduced from the inflator;
wherein the sub-chamber has a communication path formed therein that connects the sub-chamber to the curtain airbag;
wherein the curtain airbag is provided with a tab cloth strip for supporting and fixing the curtain airbag, the tab cloth strip having an attachment section formed thereon that attaches the tab cloth strip to the vehicle body and an annular binding section that binds together the curtain airbag and the sub-chamber, and
wherein the binding section has a tearing section formed therein that tears when the curtain airbag is deployed and inflated, the binding section also having an anchoring section joining the tab cloth strip to the curtain airbag.

2. The curtain airbag device for a vehicle according to claim 1, wherein a length of the sub-chamber in the transverse direction of the vehicle when the sub-chamber is deployed and inflated is larger than a width of a gap formed between the vehicle body and the pillar garnish.

3. The curtain airbag device for a vehicle according to claim 1, further comprising a plurality of tab cloth strips for supporting and fixing the curtain airbag, each of the plurality of tab cloth strips having an attachment section attaching the tab cloth strip to the vehicle body and a binding section joining the tab cloth strip to the curtain airbag.

4. The curtain airbag device for a vehicle according to claim 1, wherein the anchoring section is attached to the curtain airbag by a sewn portion.

5. The curtain airbag device for a vehicle according to claim 1, wherein the curtain airbag and sub-chamber are circumscribed by the binding section.

6. The curtain airbag device for a vehicle according to claim 1, wherein the anchoring section is joined to the curtain airbag adjacent to the sub-chamber.

7. The curtain airbag device for a vehicle according to claim 1, wherein the anchoring section is located below the tearing section prior to deployment of the curtain airbag in the vehicle.

8. A curtain airbag device for a vehicle, the curtain airbag device comprising:
a curtain airbag configured to be attached to a vehicle between a head lining side edge and a vehicle body along the head lining side edge;
an inflator that introduces high-pressure gas to inflate the airbag, wherein, when the curtain airbag is inflated, the airbag applies pressure to the head lining side edge and causes the head lining side edge to separate from a pillar garnish upper end section, the airbag being deployed from a downward opening formed between the head lining side edge and the pillar garnish upper end section, and toward the interior side of a vehicle cabin,
wherein the curtain airbag has a sub-chamber formed therein that is folded together with the curtain airbag, the sub-chamber being disposed adjacently thereto;

wherein the sub-chamber has a communication path formed therein that connects the sub-chamber to the curtain airbag; and wherein, when the airbag is inflated and deployed, the subchamber and the curtain airbag are inflated by the high-pressure gas introduced from the inflator in a state of where the sub-chamber and the curtain airbag are disposed parallel to each other in a transverse direction of the vehicle, and the sub-chamber is deployed and inflated on the vehicle exterior side of the curtain airbag, thereby pushing the curtain airbag toward the interior side of a vehicle cabin;

wherein the curtain airbag is provided with a tab cloth strip for supporting and fixing the curtain airbag, the tab cloth strip having an attachment section formed thereon that attaches the tab cloth strip to the vehicle body and an annular binding section that binds together the curtain airbag and the sub-chamber, and wherein the binding section has a tearing section formed therein that tears when the curtain airbag is deployed and inflated, the binding section also having an anchoring section joining the tab cloth strip to the curtain airbag.

9. The curtain airbag device for a vehicle according to claim 8, further comprising a plurality of tab cloth strips for supporting and fixing the curtain airbag, each of the plurality of tab cloth strips having an attachment section attaching the tab cloth strip to the vehicle body and a binding section joining the tab cloth strip to the curtain airbag.

10. The curtain airbag device for a vehicle according to claim 8, wherein the anchoring section is attached to the curtain airbag by a sewn portion.

11. The curtain airbag device for a vehicle according to claim 8, wherein the curtain airbag and sub-chamber are circumscribed by the binding section.

12. The curtain airbag device for a vehicle according to claim 8, wherein the anchoring section is joined to the curtain airbag adjacent to the sub-chamber.

13. A curtain airbag device for a vehicle, the curtain airbag comprising:
a curtain airbag configured to be attached to a vehicle between a head lining side edge and a vehicle body along the head lining side edge;
an inflator that introduces high-pressure gas to inflate the airbag, wherein, when the curtain airbag is inflated, the airbag applies pressure to the head lining side edge and causes the head lining side edge to separate from a pillar garnish upper end section, the airbag being deployed from a downward opening, formed between the head lining side edge and the pillar garnish upper end section, and toward the interior side of a vehicle cabin,
wherein the curtain airbag has a sub-chamber formed therein that is folded together with the curtain airbag and disposed adjacently thereto;
wherein the curtain airbag is further provided with a gas duct connected to the inflator and to which high-pressure gas is introduced by action of the inflator, and a secondary inflation section that is inflated by high-pressure gas which has passed through the gas duct;
wherein the sub-chamber has a communication path formed therein that connects the sub-chamber to the gas duct; and
wherein the sub-chamber and the secondary inflation section are inflated by the high-pressure gas introduced from the inflator in a state where the sub-chamber and the curtain airbag are disposed parallel to each other in a transverse direction of the vehicle while the sub-chamber is being positioned on the exterior side of the vehicle, and the gas duct is inflated between the sub-chamber and the secondary inflation section, whereby, during inflation, the secondary inflation section is pushed by the sub-chamber and the gas duct toward the interior side of a vehicle cabin;
wherein the curtain airbag is provided with a tab cloth strip for supporting and fixing the curtain airbag, the tab cloth strip having an attachment section formed thereon that attaches the tab cloth strip to the vehicle body and an annular binding section that binds together the curtain airbag and the sub-chamber, and wherein the binding section has a tearing section formed therein that tears when the curtain airbag is deployed and inflated, the binding section also having an anchoring section joining the tab cloth strip to the curtain airbag.

14. The curtain airbag device for a vehicle according to claim 13, wherein a length of the sub-chamber and the gas duct in the transverse direction of the vehicle when the sub-chamber and the gas duct are deployed and inflated is larger than a width of a gap formed between the vehicle body and the pillar garnish.

15. The curtain airbag device for a vehicle according to claim 14, wherein the sub-chamber is provided in a position so as to be deployed and inflated further upward than the pillar garnish upper end section.

16. The curtain airbag device for a vehicle according to claim 15, wherein the sub-chamber is provided with a plurality of communication paths.

17. The curtain airbag device for a vehicle according claim 16, wherein a length of the sub-chamber in the longitudinal direction of the vehicle is larger than a length of the pillar garnish in the longitudinal direction of the vehicle.

18. The curtain airbag device for a vehicle according to claim 17, wherein the sub-chamber protrudes from a front end section and a rear end section of the pillar garnish.

19. The curtain airbag device for a vehicle according to claim 18, wherein the folded curtain airbag is wound so that a draw-out direction thereof faces the vehicle exterior side.

20. The curtain airbag device for a vehicle according to claim 19, wherein the tearing section is formed of a main slit line formed in the tab cloth strip and a sub-slit line formed on the circumference of the main slit line.

* * * * *